United States Patent
Tsai

(10) Patent No.: US 10,507,474 B2
(45) Date of Patent: Dec. 17, 2019

(54) NOZZLE FOR FAST INFLATION AND DEFLATION

(71) Applicant: DONGGUAN TIGER POINT METAL & PLASTIC PRODUCTS CO., LTD, Dongguan, Guang Dong Province (CN)

(72) Inventor: Chun-Chung Tsai, New Taipei (TW)

(73) Assignee: DONGGUAN TIGER POINT METAL & PLASTIC PRODUCTS CO., LTD., Dongguan, Guang Dong Province (CN)

( * ) Notice: Subject to any disclaimer, the term of this patent is extended or adjusted under 35 U.S.C. 154(b) by 0 days.

(21) Appl. No.: 15/841,581

(22) Filed: Dec. 14, 2017

(65) Prior Publication Data

US 2019/0184408 A1 Jun. 20, 2019

(51) Int. Cl.
| | |
|---|---|
| *F16K 15/20* | (2006.01) |
| *B05B 1/00* | (2006.01) |
| *F16K 15/14* | (2006.01) |
| *B65D 51/16* | (2006.01) |
| *F16K 24/06* | (2006.01) |

(52) U.S. Cl.
CPC ............ *B05B 1/005* (2013.01); *F16K 15/147* (2013.01); *F16K 15/202* (2013.01); *F16K 15/205* (2013.01); *B65D 51/1683* (2013.01); *F16K 24/06* (2013.01); *Y10T 137/3584* (2015.04)

(58) Field of Classification Search
CPC ................. F16K 15/147; F16K 15/202; Y10T 137/3584; Y10T 137/374; Y10T 137/3755; Y10T 137/3771
See application file for complete search history.

(56) References Cited

U.S. PATENT DOCUMENTS

| | | | | |
|---|---|---|---|---|
| 2,044,913 A | * | 6/1936 | Miller | F16K 15/202 137/223 |
| 2,710,622 A | * | 6/1955 | Chupa | F16K 15/202 137/223 |
| 2,839,073 A | * | 6/1958 | Marsh | F16K 15/202 137/232 |
| 2,887,120 A | * | 5/1959 | De See | F16K 15/202 137/223 |
| 2,977,973 A | * | 4/1961 | Chakine | F16L 55/1141 116/DIG. 44 |

(Continued)

OTHER PUBLICATIONS

Macmillan Dictionary, "arc". Printed Apr. 8, 2019.*

*Primary Examiner* — Robert K Arundale
(74) *Attorney, Agent, or Firm* — Juan Carlos A. Marquez; Marquez IP Law Office, PLLC

(57) ABSTRACT

A nozzle for fast inflation and deflation includes a flexible plastic body, an air tube, and a sealing plug. The flexible plastic body is connected to a bottom of the air tube, and the sealing plug is flexibly connected to an outer port of the air tube. A valve sheet is in the flexible plastic body. For air inflation or deflation, a gap as an air channel is formed between the valve sheet and the air tube for inflation or deflation without pressing the flexible plastic body. To store air, the air tube is bent downward until the flexible plastic body is deformed to cause the valve sheet to contact the inner port of the air tube so as to avoid air leakage. Then, the air tube is allowed to be slowly plugged by the sealing plug. The problem of internal air leaking out is thus fully solved.

2 Claims, 3 Drawing Sheets

(56) References Cited

U.S. PATENT DOCUMENTS

| | | | | |
|---|---|---|---|---|
| 4,823,831 A * | 4/1989 | Jaw | ................ | F16K 15/202 |
| | | | | 137/223 |
| 5,119,842 A * | 6/1992 | Jaw | ................ | B60P 7/065 |
| | | | | 137/232 |
| 5,271,531 A * | 12/1993 | Rohr | ................ | B65D 47/0833 |
| | | | | 215/232 |
| 5,343,889 A * | 9/1994 | Jaw | ................ | F16K 15/202 |
| | | | | 137/232 |
| 5,351,711 A * | 10/1994 | Peter | ................ | F16K 15/202 |
| | | | | 137/232 |
| 6,164,314 A * | 12/2000 | Saputo | ................ | F16K 15/202 |
| | | | | 137/232 |
| 6,386,247 B1 * | 5/2002 | Elze | ................ | B65D 81/052 |
| | | | | 137/223 |
| 6,814,639 B1 * | 11/2004 | Peterson | ................ | F16K 15/205 |
| | | | | 441/41 |
| 2006/0272707 A1 * | 12/2006 | Wu | ................ | F16K 15/202 |
| | | | | 137/223 |
| 2008/0223449 A1 * | 9/2008 | Culp | ................ | F16K 15/202 |
| | | | | 137/232 |
| 2012/0090699 A1 * | 4/2012 | Lau | ................ | F16K 15/202 |
| | | | | 137/231 |
| 2017/0198824 A1 * | 7/2017 | Nguyen | ................ | F16K 15/147 |

\* cited by examiner

NOZZLE FOR FAST INFLATION AND DEFLATION

BACKGROUND OF THE INVENTION

1. Field of the Invention

The present invention generally relates to a nozzle for an inflation product, and more specifically to a convenient nozzle for fast air inflation and deflation.

2. The Prior Arts

As people live well, many air inflation products are provided to the market such as inflation bed, chair, doll, climbing rock, pool and so on. The fancy air inflation product always draws a lot of attention because its structure is simple and it is easy to carry and store. Thus, the inflation products are widely used. The inflation product is commonly provided with a nozzle for inflation/deflation, which is generally categorized as two types.

The first type of nozzle comprises a flexible body, an air tube, and a sealing plug. The air tube air tube is connected to one end of the flexible body, and the sealing plug is intended to cover an outer port of the air tube. In this type of nozzle, the air channel between the air tube and the flexible body is free of any block or obstacle. As a result, the sealing plug should quickly and tightly plug the air tube after inflation, or lots of air leaks out.

The second type of nozzle generally comprises a nozzle body and a unidirectional valve. The unidirectional valve comprises an air tube. The internal end of the air tube is sealed, and the internal wall of the air tube is partly cut to form a notch for the unidirectional valve. This solution requires the air tube to form the cut notch, and causes the nozzle hard to process. As a result, the mass production nozzle has a poor yield. In addition, a stream of air flowing into the inflation product for air inflation requires greater pressure, and an air pump with high quality is needed such that flexibility of application is quite limited. Or, the nozzle body should be tightly pressed by hands to fully release the notch and assure lots of air for inflation/deflation. However, the hands are easily tired by pressing the nozzle body of a large scale of inflation product for a while. It is obvious that the inflation products in the prior arts have many problems in actual use.

SUMMARY OF THE INVENTION

To overcome the problems in the prior arts, the primary object of the present invention is to provide a nozzle for fast air inflation and deflation, which has a simple structure, and is easy to implement and use.

To implement the above object, the present invention employs the following solution.

The nozzle for fast air inflation and deflation of the present invention comprises a flexible plastic body, an air tube, and a sealing plug. The flexible plastic body has a horn shape, and is connected to a bottom of the air tube. The sealing plug is flexibly connected to an outer port of the air tube. A valve sheet is provided in an internal chamber of the flexible plastic body. For air inflation or deflation, a region where the valve sheet and the air tube are not in contact forms an air channel. To store air, the air tube is pushed until the flexible plastic body is deformed and bent toward the valve sheet sealing an inner port of the air tube, and the outer port of the air tube is covered and sealed by the sealing plug.

It is preferred that the flexible plastic body and the air tube are formed as an integrated structure.

Preferably, the valve sheet has an arc thin shape, and is provided with a mediate sealing part and two connection parts extended from the mediate sealing part, and each of the connection part has an end narrower than the mediate sealing part.

Also, the sealing plug and the air tube are preferably formed as an integrated structure, and the sealing plug and the air tube are connected through a flexible connection strip.

It is preferred that the sealing plug is configured to fit and cover the outer port of the air tube.

In contrast with the prior arts, the present invention obviously has advantages and effects. Specifically, the valve sheet is integrated into the conventional nozzle, and provided in the internal chamber of the flexible plastic body. For normal inflation/deflation, a gap is kept between the valve sheet and the inner port of the air tube to naturally open an air channel without pressing the flexible body to directly perform inflation/deflation. To store or keep air, the air tube is pressed or bent downward until the flexible plastic body is deformed downward, and the inner port of the air tube is in contact with the valve sheet such that the inner port is sealed by the valve sheet without air leaking out. Then, the sealing plug is allowed to slowly cover and plug the air tube, thereby overcome the traditional drawback that a lot of air leaks out because the air tube is not quickly sealed by the sealing plug. The embodiment and the accompanying figures are intended to explain the aspects and features of the present invention.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Please refer to FIGS. 1-5 illustrating the detailed structure of the nozzle for fast air inflation and deflation according to the embodiment of the present invention. The nozzle for fast air inflation and deflation of the present invention is a convenient nozzle, and generally comprises a flexible plastic body 10, an air tube 20, and a sealing plug 30.

Figure 1:
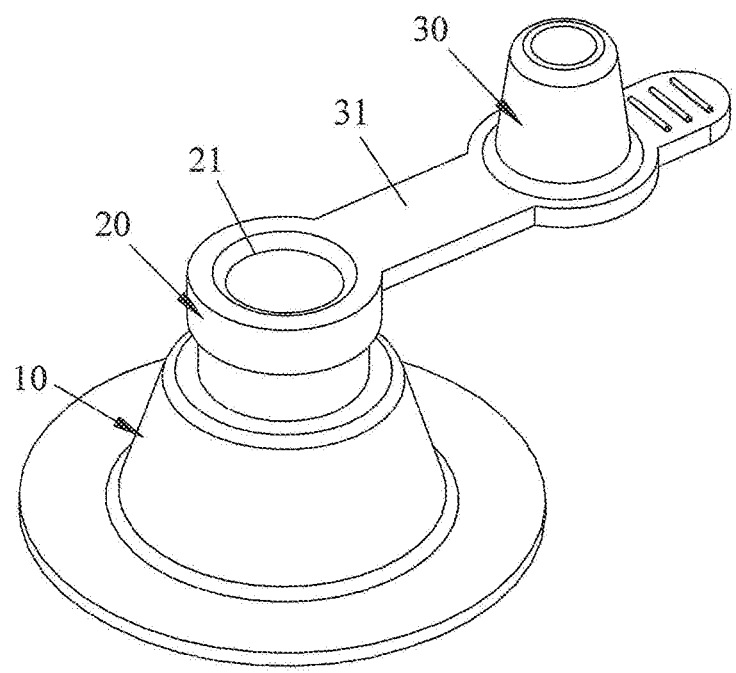
FIG. 1 is a top perspective view showing the nozzle for fast air inflation and deflation according to the embodiment of the present invention.
Figure 2:
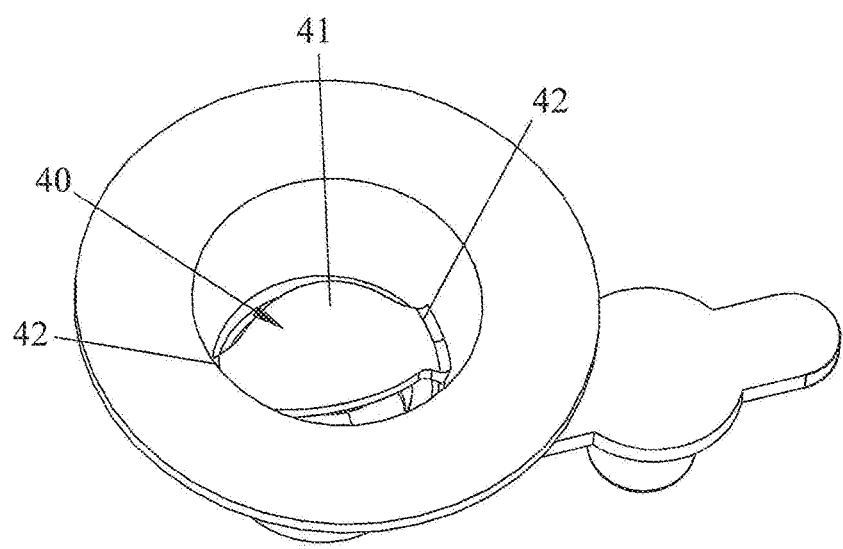
FIG. 2 is a bottom perspective view showing the nozzle of the present invention.
Figure 3:
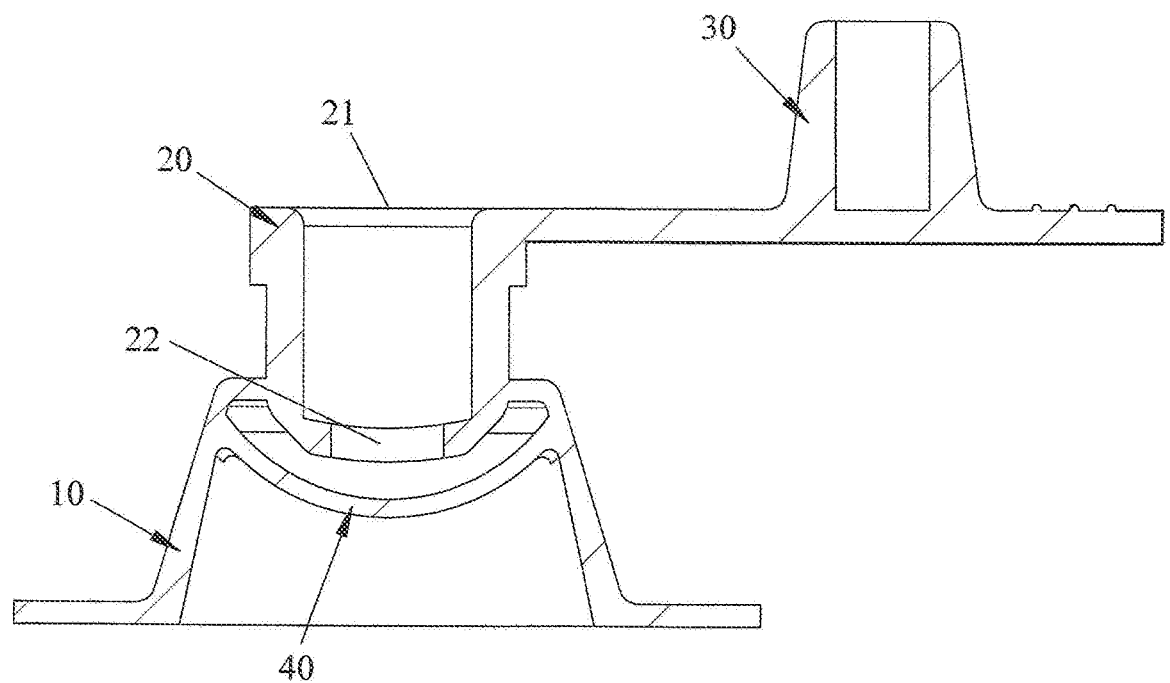
FIG. 3 is a cross sectional view showing the nozzle for fast air inflation and deflation according to the embodiment of the present invention.
Figure 4:
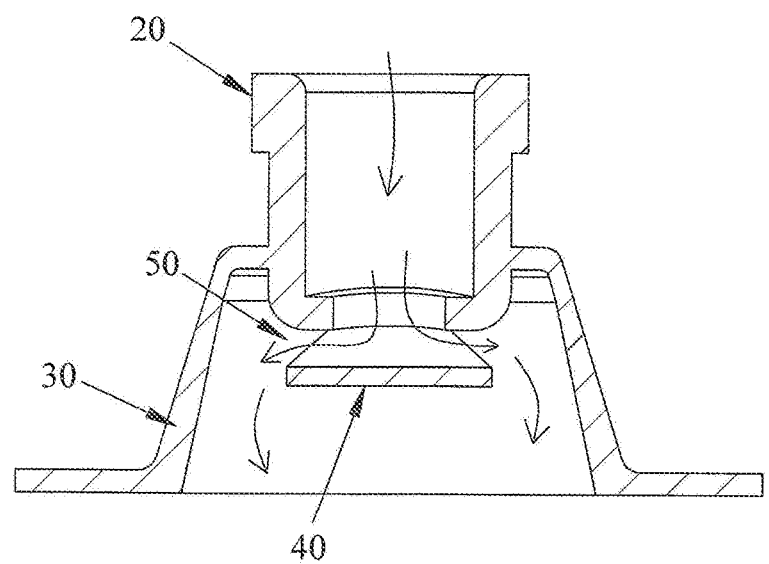
FIG. 4 is another cross sectional view showing the nozzle of the present invention.
Figure 5:
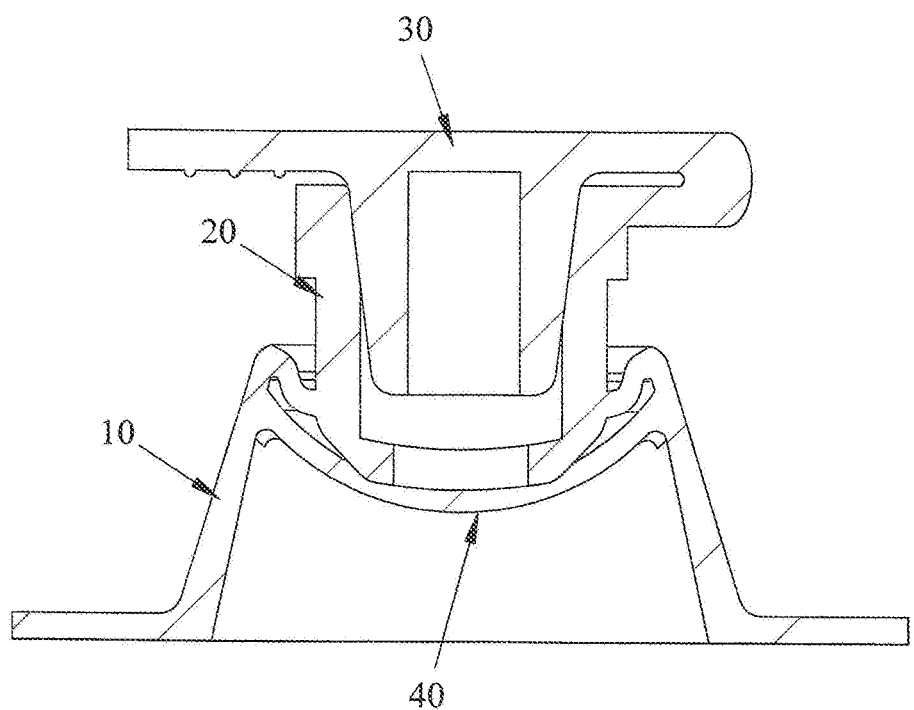
FIG. 5 is a structural view showing the nozzle for storing air according to the present invention.

The flexible plastic body 10 has a horn shape, and is connected to a bottom of the air tube 20. The sealing plug 30 is flexibly connected to an outer port 21 of the air tube 20. A valve sheet 40 is provided in an internal chamber of the flexible plastic body 10. As shown in FIG. 4 for air inflation or deflation, a region where the valve sheet 40 and the air tube 20 are not in contact forms an air channel 50. The valve sheet 40 will not bother inflation/deflation. To store or keep air, the air tube 20 is pushed until the flexible plastic body 10 is deformed and bent toward the valve sheet 40 sealing an inner port 22 of the air tube 20 so as to avoid air leaking out for a short period of time. Then, the air tube 20 is covered, plugged, and sealed by the sealing plug 30.

In the embodiment of the present invention, the valve sheet 40 has an arc thin shape, and is provided with a mediate sealing part 41 and two connection parts 22 outward extended from the mediate sealing part 41. The mediate sealing part 41 has an area greater than the inner port 22 of the air tube 20 to assure that the inner port 22 is tightly sealed. Each connection part 42 has an end narrower than the mediate sealing part 41 such that a stream of air freely flows through the air channel 50 for inflation/deflation, thereby speeding up the whole process of inflation/deflation.

The air tube 20 and the flexible plastic body 10 are formed as an integrated structure, which is simple and easy to manufacture such as one step of plastic moding or injection. The manufacturing efficiency of the nozzle is greatly improved. The sealing plug 30 and the air tube 20 is formed as an integrated body, and a flexible connection strip 31 is preferably provided between the sealing plug 30 and the air tube 20. When the sealing plug 30 covers and plugs the outer port 21 of the air tube 20, the air tube 20 is well fitted.

From the above mention, the primary feature of the present invention is that the valve sheet 40 is specifically integrated into the conventional nozzle, and provided in the internal chamber of the flexible plastic body 10. For normal inflation/deflation, the air tube 20 is pulled out from the flexible plastic body 10, and the valve sheet 40 and the air tube 20 keep a gap such that the air channel 50 is open, and the process of inflation/deflation is performed without pressing the flexible plastic body 10. To keep or store air, the air tube 20 is pressed or bent downward until the flexible plastic body 10 is deformed downward, and the inner port 22 of the air tube 20 is in contact with the valve sheet 40 such that the inner port 22 is sealed by the valve sheet 40 without air leaking out. Then, the sealing plug is allowed to slowly cover and plug the air tube 20, thereby overcome the traditional drawback that a lot of air leaks out because the air tube 20 is not quickly enough sealed by the sealing plug 30.

Although the present invention has been described with reference to the preferred embodiments thereof, it is apparent to those skilled in the art that a variety of modifications and changes may be made without departing from the scope of the present invention which is intended to be defined by the appended claims.

What is claimed is:
1. A nozzle for inflation and deflation, comprising:
   a flexible plastic body having a horn shape and provided with a valve sheet in an internal chamber of the flexible plastic body;
   an air tube having a bottom jointed to the flexible plastic body; and
   a sealing plug for being movably connected to an outer port of the air tube,
   wherein a region where the valve sheet and the air tube are not in contact forms an air channel for air inflation and deflation, the air tube is pushed until the flexible plastic body is deformed and bent toward the valve sheet for keeping or storing air to avoid air leakage for a period of time, an inner port of the air tube is sealed by the valve sheet, and an inner port of the air tube is plugged and sealed by the sealing plug;
   wherein the flexible plastic body and the air tube are formed as an integrated structure;
   wherein the valve sheet has an arc shape, and is provided with a mediate sealing part and two connection parts extended from the mediate sealing part, and each of the connection parts has an end narrower than the mediate sealing part; and
   wherein the mediate sealing part has an area greater than the inner port of the air tube.
2. The nozzle as claimed in claim 1, wherein the sealing plug is configured to fit and cover the outer port of the air tube.

* * * * *